United States Patent

[11] 3,583,670

| [72] | Inventor | Wilhelm Manske |
| | | Effretikon, Switzerland |
| [21] | Appl. No. | 805,751 |
| [22] | Filed | Mar. 10, 1969 |
| [45] | Patented | June 8, 1971 |
| [73] | Assignee | Escher Wyss Limited |
| | | Zurich, Switzerland |
| [32] | Priority | Mar. 28, 1968 |
| [33] | | Switzerland |
| [31] | | 4632/68 |

[54] BUTTERFLY VALVE AND SEALING MEANS THEREFOR
13 Claims, 2 Drawing Figs.

| [52] | U.S. Cl. | 251/307 |
| [51] | Int. Cl. | F16k 1/22 |
| [50] | Field of Search | 251/171, 173, 305, 6, 7 |

[56] References Cited
UNITED STATES PATENTS

| 3,025,035 | 3/1962 | Swain | 251/306 |
| 3,144,040 | 8/1964 | White | 251/307X |
| 3,156,445 | 11/1964 | Swain | 251/171 |
| 3,260,496 | 7/1966 | Borcherdt | 251/171 |
| 3,282,558 | 11/1966 | Swain | 251/173X |
| 3,393,697 | 7/1968 | Fawkes | 251/171X |

Primary Examiner—Henry T. Klinksiek
Attorney—Hutchinson & Milans

ABSTRACT: A butterfly valve for a pipeline, more particularly of hydraulic power stations, having a housing and a valve plate with two pivots; a sealing ring of flexible material arranged in a groove of said housing, and bearing, in the closed position of said valve, against the peripheral surface of said valve plate; said sealing ring having a solid cross-sectional profile; and axially movable pressure ring forming one of the two sidewalls of said groove.

BUTTERFLY VALVE AND SEALING MEANS THEREFOR

BACKGROUND OF THE INVENTION

In known butterfly valves, there is difficulty in achieving satisfactory sealing between the valve plate and housing in the closed position of the valve.

In one known valve, a hollow sealing ring of flexible material is arranged in a groove of the housing, the cavity of which sealing ring can be put under pressure in the closed position of the valve, so that the sealing ring bears by its sealing surface against the peripheral surface of the valve plate. For this known sealing ring, however, a device is necessary for supplying and controlling the pressure medium to be introduced into the cavity. This device and the hollow sealing ring are complicated in construction and are susceptible to trouble.

SUMMARY OF THE INVENTION

The invention is based on the problem of ensuring satisfactory application of the sealing ring against the valve plate in s simpler way, and of making the seal more reliable in operation.

In a butterfly valve of the hereinbefore described kind, used for pipelines, more particularly of hydraulic power stations, this problem is solved according to the invention in that said sealing ring has a solid cross-sectional profile and with its end constituting the sealing surface extending into the fluid conduit of the pipeline, and therein one of the two walls confining axially the groove for said sealing ring is formed by an axially movable pressure ring.

Advantageously, said pressure ring is adapted to be pressed axially against said sealing ring by means of adjusting elements, for example by means of pressure screws, extending into the environment of said housing.

BRIEF DESCRIPTION OF THE DRAWING

An embodiment of the invention is shown by way of example in simplified form in the drawing, in which.

DESCRIPTION OF THE PREFERRED EMBODIMENT

Figure 1:
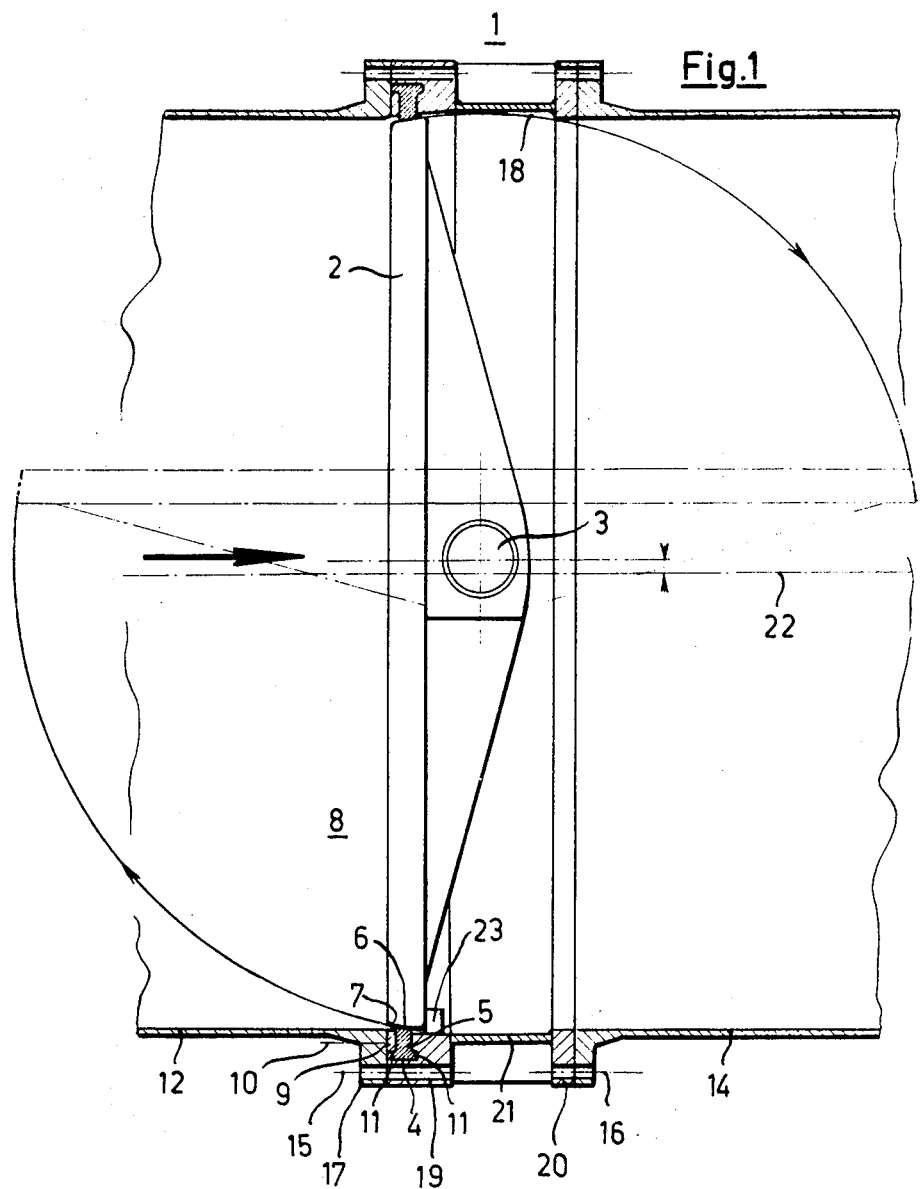
FIG. 1 shows an axial section through a butterfly valve constructed according to the invention.

The butterfly valve shown, for a pipeline, i.e., the pressure conduit of a hydraulic power station, has a housing 1 and a valve plate 2, which is mounted in said housing by means of two pivots 3, of which only one is visible in the drawing. A sealing ring 5 of flexible material is provided in a groove 4 of said housing and, in the closed position of the valve plate 2, has its sealing surface 6 bearing against the outer peripheral surface 7 of the said valve plate. Said said sealing ring has a solid cross-sectional profile with its inner end having the sealing surface 6 extending into a fluid conduit, i.e., the water conduit 8 of the housing 1. One of the two walls, axially confining the groove 4 for the sealing ring 5, is formed by an axially movable pressure ring 9.

This pressure ring 9 is adapted to be pressed axially against the sealing ring 5 by means of adjusting elements, extending into the environment of the housing 1, i.e., by pressure screws 10.

The sealing ring 5 having a solid cross-sectional profile is a very robust element of long life. Nonetheless, it is easily and extremely finely adjustable by tightening the pressure screws 10 if necessary to different degrees of tightness, so that just the necessary pressing of the sealing surface 6 against the valve plate 2 can be attained everywhere over the ring periphery. In this way, the valve plate 2 can be opened and closed with slight resilient deformation only of the sealing ring. The seal does not have to be disarranged for this purpose.

The sealing ring 5 is anchored in the groove 4 by forward and rearward projections 11, and fills the entire space of the groove 4. The pressure ring 9 is arranged upstream of the sealing ring 5, so that the water pressure, during the closed position of the valve, presses the sealing ring against the fixed wall formed by the housing and confining the groove axially.

Figure 2:
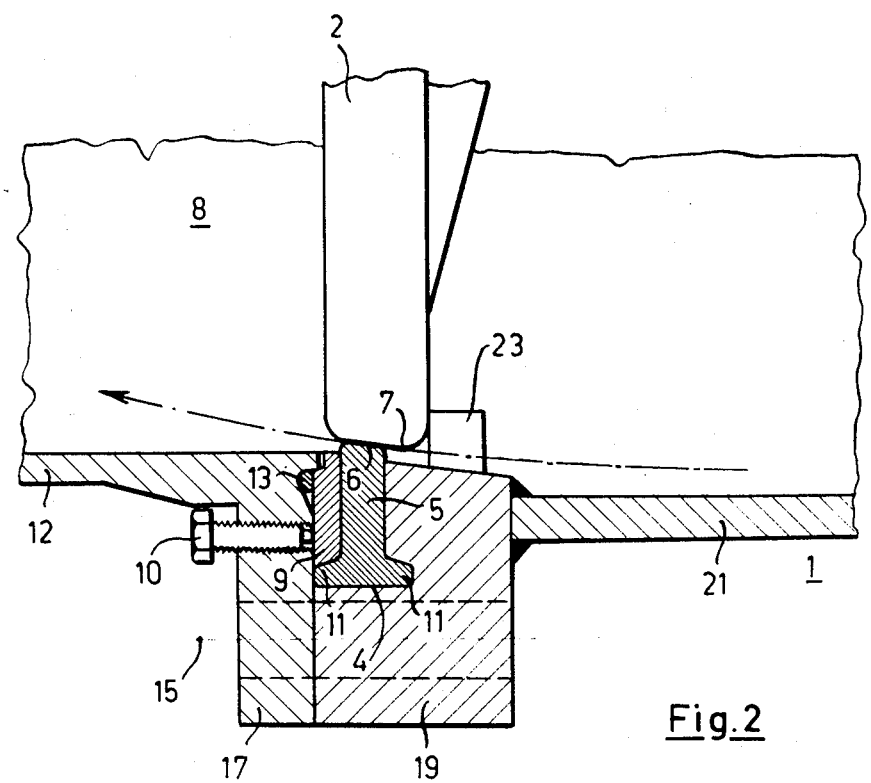
FIG. 2 shows a portion of FIG. 1 on a larger scale.

Upstream, the pressure ring, on its side facing the water conduit 8, is sealed axially movable in relation to the wall of the water conduit. This wall of the water conduit is formed by a pipe 12 adjoining the housing 1 and, as shown in FIG. 2, a sealing ring 13, customary in pressure conduit flanges, serves as an axially movable seal.

Downstream, the housing 1 is adjoined by a pipe 14. The housing 1 is connected to the pipes 12 and 14 by means of flange connections with screws 15 and 16.

The sealing ring 5 and the pressure ring 9 are formed as closed rings and lie in planes perpendicular to the axis of the pipeline. The pivots 3 of the valve plate 2 are arranged outside the planes determined by the two rings 5 and 9, the two rings 5, 9 being situated upstream of the pivots 3. The two rings 5 and 9 lie in a recess of the housing 1, which recess is open in one axial direction of the pipeline 12, 14. The axial opening of the recess is covered by the flange 17 of the pipe 12 adjoining the housing 1, resulting in simple machining of the housing 1 and easily mounting the rings 5, 9.

The internal diameter of the sealing ring 5 is less than the internal diameter of the pipeline 12, 14 only by the clearance necessary between the housing 1 and the valve plate 2, that is to say, it is approximately equal to the internal diameter of the pipeline. Flow through the valve is therefore practically not subject to any constriction. Accordingly, the housing 1 is widened slightly at 18, permitting the valve plate 2 to rotate from the closed position to the open position. This widened portion is bounded by the flanges 19, 20 of the housing 1 and a cylindrical pipe length 21, coaxial with the said flanges and serving as a housing wall.

So that, in the closed position, the valve will have a tendency to close, the axis of the pivots 3 is situated outside the axis 22 of the pipeline 12, 14. The opening moment of the valve plate 2 in the closed position is taken up by means of a stop 23 secured to the housing.

I claim:

1. In a butterfly valve construction for a pipeline defining a fluid conduit primarily adaptable for hydraulic power stations, wherein said pipeline is provided with flanged end connection means, comprising a housing body having a flow passage therethrough and an annular interior recess about said flow passage, a valve plate pivotally mounted within said body on an axis of rotation at right angles to the flow of fluid through said body, A sealing ring of flexible material seated in said annular recess having its inner periphery adapted to bear against the outer peripheral surface of said valve plate when the latter is in valve closed position, said sealing ring having a solid cross-sectional profile and extending into said fluid passage, an axially movable pressure ring mounted in said annular interior recess and forming one wall of the two axially confining walls of said recess, and adjusting means extending through the flange of the pipeline and into said annular recess for axially pressing said pressure ring against said sealing ring.

2. A butterfly valve construction as defined in claim 1 wherein said annular interior recess is open in one axial direction of said pipeline and is closed in the axial direction by the abutting flange of said pipeline to form the sealing ring retaining groove, and wherein the adjusting means extends through said abutting flange.

3. A butterfly valve according to claim 1, in which said sealing ring has forward and rearward projections anchored in said groove.

4. A butterfly valve according to claim 1, in which said sealing ring fills the entire space of said groove.

5. A butterfly valve according to claim 1, in which said pressure ring is arranged upstream of said sealing ring.

6. A butterfly valve according to claim 1, in which said pressure ring, on its side facing said conduit, has a sealing member axially movably sealing said pressure ring in relation to the wall of said conduit.

7. A butterfly valve according to claim 1, in which said sealing ring and said pressure ring are closed rings, and said pivots of said valve plate lie outside the planes determined by said sealing ring and said pressure ring.

8. A butterfly valve according to claim 7, in which said sealing ring and said pressure ring lie in planes perpendicular to the axis of said pipeline.

9. A butterfly valve according to claim 7, in which said sealing ring and said pressure ring are arranged upstream of said pivots.

10. A butterfly valve according to claim 7, in which the internal diameter of said sealing ring is approximately equal to the internal diameter of said pipeline.

11. A butterfly valve according to claim 1, in which said housing has a widened portion permitting rotation of said valve plate from the closed position to the open position.

12. A butterfly valve according to claim 11, in which said housing has two flanges and a cylindrical pipe length confining said widened portion.

13. A butterfly valve according to claim 1, in which the pivotal axis of said valve plate lies outside the axis of said pipeline.